US012586609B2

(12) United States Patent
Bisti et al.

(10) Patent No.: US 12,586,609 B2
(45) Date of Patent: Mar. 24, 2026

(54) USING AUDIO ANCHOR POINTS TO SYNCHRONIZE RECORDINGS

(71) Applicant: International Business Machines Corporation, Armonk, NY (US)

(72) Inventors: Jeffrey Bisti, New Paltz, NY (US); Philip Siconolfi, Croton on Hudson, NY (US); Robert Paquin, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 18/340,082

(22) Filed: Jun. 23, 2023

(65) Prior Publication Data

US 2024/0428826 A1     Dec. 26, 2024

(51) Int. Cl.
*G11B 27/036*     (2006.01)
*G11B 27/34*     (2006.01)

(52) U.S. Cl.
CPC ............ *G11B 27/036* (2013.01); *G11B 27/34* (2013.01)

(58) Field of Classification Search
CPC ....... G11B 27/036; G11B 27/34; G11B 27/00; G11B 27/002; G11B 27/10; G11B 27/11; H04N 5/144; H04N 5/147; H04N 19/142; H04N 21/47217; H04N 21/044
USPC ........................................................ 386/241
See application file for complete search history.

(56) References Cited

U.S. PATENT DOCUMENTS 5,040,081 A     8/1991  McCutchen
7,057,663 B1    6/2006  Lee

| 7,627,477 | B2 | 12/2009 | Wang et al. |
| 8,849,432 | B2 | 9/2014 | Moorer |
| 9,774,896 | B2 | 9/2017 | Clavenna |
| 10,306,128 | B2 | 5/2019 | Eramian |
| 2004/0093202 | A1 | 5/2004 | Fischer et al. |
| 2010/0040349 | A1* | 2/2010 | Landy ................... G11B 27/005 |
| | | | 386/239 |
| 2019/0141388 | A1* | 5/2019 | Wang ...................... G06F 16/41 |
| 2021/0195275 | A1 | 6/2021 | Opsenica |
| 2022/0279222 | A1* | 9/2022 | Newell .............. H04N 21/4223 |

(Continued)

OTHER PUBLICATIONS

Phidgets, "IR Remote Control Primer", Phidgets Inc., Aug. 2, 2012, 5 Pages.

*Primary Examiner* — Thai Q Tran
*Assistant Examiner* — Nienru Yang
(74) *Attorney, Agent, or Firm* — Eric W. Chesley

(57)     ABSTRACT

According to one embodiment, a method, computer system, and computer program product for synchronizing recordings by using audio anchor points is provided. The embodiment may include identifying two or more recording devices and a plurality of video recordings, including at least one video recording from each of at least two of the two or more recording devices. The embodiment may also include establishing a connection between the two or more recording devices. The embodiment may further include setting one or more anchor points in time based on the plurality of video recordings. The embodiment may also include inserting an audio sequence into at least two of the plurality of video recordings at an anchor point in the one or more anchor points. The embodiment may further include combining the at least two of the plurality of video recordings based on the audio sequence.

19 Claims, 3 Drawing Sheets

(56) References Cited

U.S. PATENT DOCUMENTS

2023/0080122 A1*  3/2023  Lee ........................ H04L 63/08
726/7

* cited by examiner

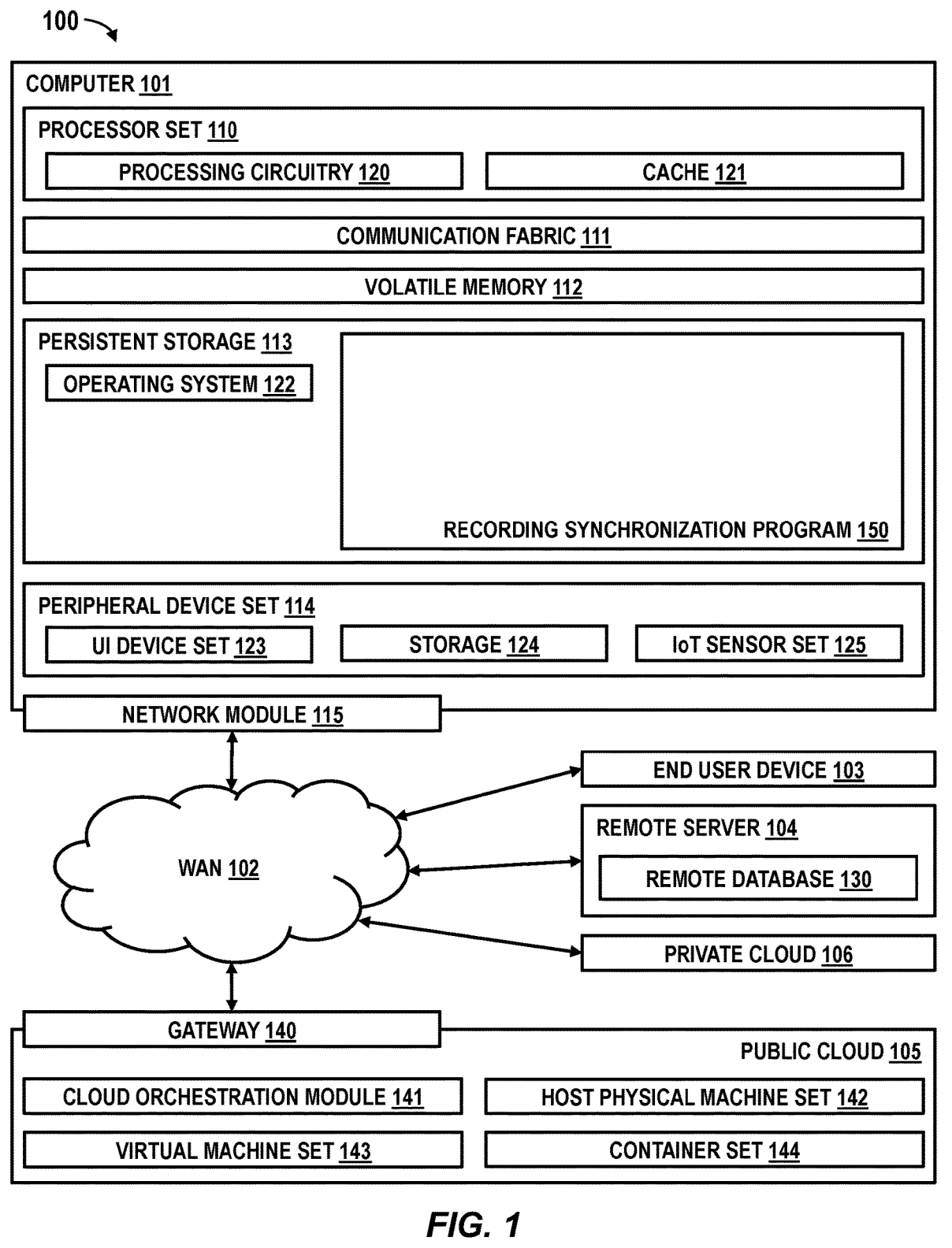

100

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

RECORDING SYNCHRONIZATION PROGRAM 150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*FIG. 1*

START

202 — IDENTIFY TWO OR MORE RECORDING DEVICES

204 — ESTABLISH A CONNECTION BETWEEN RECORDING DEVICES

206 — SET AUDIO ANCHOR POINTS FOR RECORDINGS

208 — COMBINE RECORDINGS BASED ON ANCHOR POINTS

END

USING AUDIO ANCHOR POINTS TO SYNCHRONIZE RECORDINGS

BACKGROUND

The present invention relates generally to the field of computing, and more particularly to video editing.

Video editing is the process of modifying and arranging video and audio clips into a desired outcome. Modern video and audio are often recorded using multiple devices. Such methods of recording require tools to combine, synchronize, and edit video and audio into a coherent, usable format. Recordings may be synchronized automatically by software, or manually by human editors.

SUMMARY

According to one embodiment, a method, computer system, and computer program product for synchronizing recordings by using audio anchor points is provided. The embodiment may include identifying two or more recording devices and a plurality of video recordings, including at least one video recording from each of at least two of the two or more recording devices. The embodiment may also include establishing a connection between the two or more recording devices. The embodiment may further include setting one or more anchor points in time based on the plurality of video recordings. The embodiment may also include inserting an audio sequence into at least two of the plurality of video recordings at an anchor point in the one or more anchor points. The embodiment may further include combining the at least two of the plurality of video recordings based on the audio sequence.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment.

DETAILED DESCRIPTION

Figure 2:
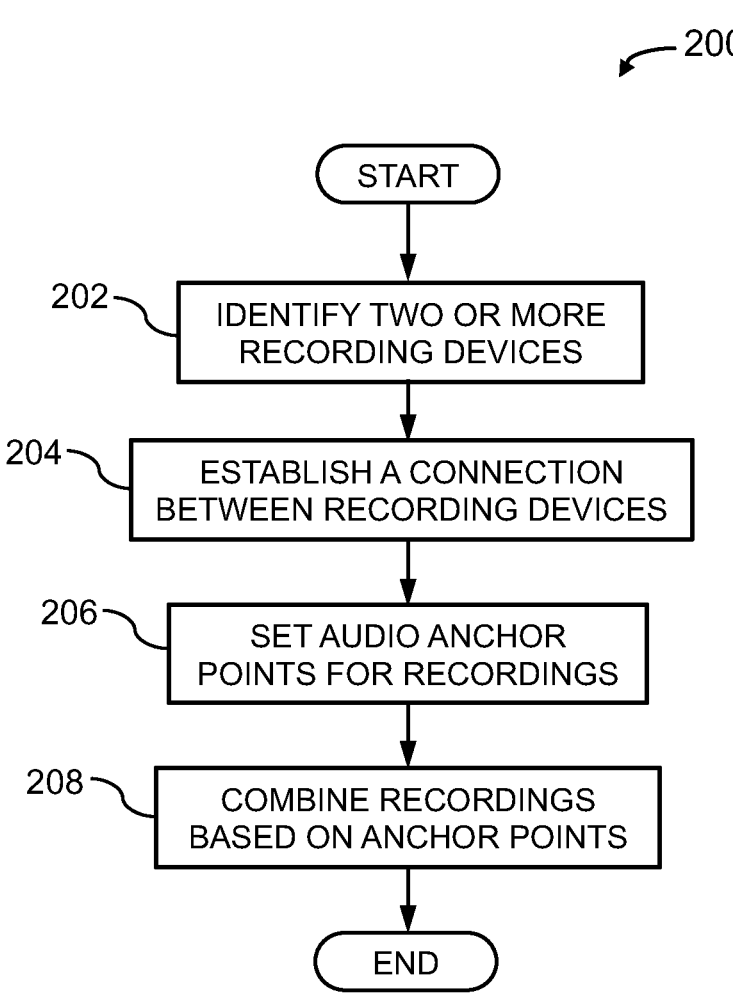
FIG. 2 illustrates an operational flowchart for a process for synchronizing recordings by using audio anchor points.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to video editing. The following described exemplary embodiments provide a system, method, and program product to, among other things, synchronize recordings using audio anchor points. Therefore, the present embodiment has the capacity to improve the technical field of video editing by making it easier to synchronize recordings between different devices.

As previously described, video editing is the process of modifying and arranging video and audio clips into a desired outcome. Modern video and audio are often recorded using multiple devices. Such methods of recording require tools to combine, synchronize, and edit video and audio into a coherent, usable format. Recordings may be synchronized automatically by software, or manually by human editors.

Since modern video and audio are often recorded on multiple devices, combining and synchronizing multiple recordings is crucial to editing a video. However, manually synchronizing video and audio for multiple clips in one video can be tedious and time-consuming. Furthermore, existing software-based solutions may not work consistently, requiring high-bandwidth wired connections, particular standards for each recording device, or specific types of cues that not every recording device is able to capture. As such, it may be advantageous to, among other things, insert audio anchor points into video recordings to assist with synchronizing those recordings.

According to one embodiment, a recording synchronization program identifies two or more recording devices. The recording synchronization program may establish a connection between those devices. The recording synchronization program may then set audio anchor points into two or more video recordings. The recording synchronization program may then combine recordings using the anchor points.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as recording synchronization program 150. In addition to recording synchronization program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and recording synchronization program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in recording synchronization program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in recording synchronization program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of the Bluetooth Special Interest Group and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The recording synchronization program 150 may identify two or more recording devices, and one or more video recordings from each device. The recording synchronization program 150 may then establish a connection between those devices. The recording synchronization program 150 may then set audio anchor points into two or more of the video recordings. Recording synchronization program 150 may then combine recordings using the anchor points.

Furthermore, notwithstanding depiction in computer 101, recording synchronization program 150 may be stored in and/or executed by, individually or in any combination, end user device 103, remote server 104, public cloud 105, and private cloud 106. The event streaming method is explained in more detail below with respect to FIG. 2.

Referring now to FIG. 2, an operational flowchart for a process for synchronizing recordings by using audio anchor points 200 is depicted according to at least one embodiment. At 202, the recording synchronization program 150 identifies two or more recording devices, and at least one recording from each device. A recording device may be any device capable of recording video, audio, other relevant types of data, or any combination thereof, such as a typical video camera, mobile phone, microphone, action camera, security camera, or other information-recording device. A recording may be a video recording, audio recording, or any other form of data captured by a recording device for any duration of time. A recording may capture a real-world scene, or may be a screen recording or another alternative recording.

A recording device may record a recording in a video format, audio format, or both. In further embodiments, recording devices may capture photographs or record data in any other form, including three-dimensional image formats, map data, or environmental data such as weather data, or any combination of the above, over time. In a preferred embodiment, the recording synchronization program 150 identifies at least two devices that record video and at least one device that records audio.

A recording may include data recorded from a single medium, such as video or audio, or a combined record of data recorded by a device, such as synchronized video, audio, and accelerometer data contained in a single video clip as recorded by a mobile phone. Each device may capture one or more recordings. For example, if a main camera captures a recording from the beginning of a sporting event to the end of the event, an ancillary camera may intermittently focus on and capture the reactions of a coach at the sporting event, but only at key times, and may stop recording in between those key times.

A recording device may be a typical video camera, a mobile phone, a microphone (including a personal microphone, lapel microphone boom microphone, a headset microphone, or a microphone embedded in another device), an action camera such as a GoPro® camera (GoPro and all GoPro-based trademarks and logos are trademarks or registered trademarks of GoPro, Inc. and/or its affiliates), a security camera, or any other device capable of capturing a recording as described above. A single recording device may contain multiple embedded recording components, such as multiple cameras, multiple microphones, and an accelerometer.

A recording may capture a real-world scene, such as a presentation, a scene in a film, a sporting event, a comedy sketch, a news report, or a dance performed for social media. A scene may be captured by multiple complete or incomplete recordings. A recording may be compressed or filtered. Alternatively, a video recording may be a video stream augmented by a live filter that, for example, converts colors into a sepia tone color scheme, or places a cartoon overlay over a person's hands, presenting the hands as cat paws. Stream augmentation may include a simple process of color correction.

In further embodiments, a video recording may be a screen recording, a computer-generated recording, or another similar recording. For example, a video recording may be a screen recording taken by a screen-recording program on a computing device with a display. Alternatively, a video recording may be generated live based on a process of artificial intelligence based on an audio recording of a concert, where the generated video is an abstract graphical representation of the music being played, or of an audience reaction to the music.

A camera may be operated by a human, by a robotic device, by an algorithmic process including a process informed by a trained machine learning model, or any combination of the above methods. For example, a machine learning model may be used to notify a human operator when an interesting event should be recorded.

Then, at 204, the recording synchronization program 150 establishes a connection between recording devices. A connection may be established over a wireless connection, such as WiFi, Bluetooth®, or a mobile network; through the internet; through a wired connection; between recording components embedded in the same device; or through any combination of these methods.

In at least one embodiment, a connection may be established over a wireless connection, such as WiFi, Bluetooth®, or a mobile network. Alternatively, a connection may be established over the internet. Setting audio anchor points at 206 may be performed in a manner that uses sufficiently small amounts of bandwidth or requires little uptime so as to support the process for synchronizing recordings by using audio anchor points 200 using even a slow or unreliable wireless connection.

Alternatively, a connection may be established over a wired connection. A wired connection may include a connection over standard data transfer cables or specialized cables for high-bitrate video. As another alternative, a connection may be established between multiple recording components embedded in the same recording device, such as multiple camera modules in a smartphone.

Next, at 206, the recording synchronization program 150 sets audio anchor points for two or more video recordings, inserting an audio sequence at or before the anchor point. An audio anchor point may be any single audio sequence inserted at a single point across multiple video recordings, for example at the same point in time. An audio sequence may be encoded in any audio format and may be any length, so long as it is sufficiently unique to function as a unique, identifiable anchor. Anchor points may be included at any single point across recordings, including at the start time of each recording, the end point of each recording, at regular time intervals, or other points of interest.

In a preferred embodiment, the recording synchronization program 150 sets audio anchor points across all recordings. Alternatively, audio anchor points may only be set in select recordings. For example, the recording synchronization program 150 may set anchor points in a master recording, and in each recording connected to the master recording device by a wireless connection, but not in recordings connected to the master recording device by a wired connection.

Anchor points may be included at any single point across recordings, such as a single point in time. For example, an anchor point may be included in all recordings starting at the start time of each recording. Alternatively, an anchor point may be set at the end point of each recording, either starting at the end point, or timed so that it ends at the end point. Anchor points may further be set at regular time intervals, such as one anchor point every ten seconds, or one anchor point fifteen seconds after each recording begins, or at any other points of interest. As an example of another point of interest, the recording synchronization program 150 may use visual recognition methods with a process of artificial intelligence and a trained neural network to recognize when a character begins to speak, and may set an anchor point at the moment each character begins to speak.

An audio sequence may be encoded in any audio format and may be any length (such as one second or two tenths of a second), so long as it is sufficiently unique to function as a unique, identifiable anchor, fingerprint, signature, or similar for the process for synchronizing recordings by using audio anchor points 200 by enabling software to distinguish between two different anchor points. An audio sequence may be encoded as a waveform, for example using pulse-width modulation, and may be added on top of existing audio for the video recording, possibly in a manner that can be parsed and removed automatically as necessary. In an alternate embodiment, an audio sequence may last for the entire duration of a video recording, or may be generated for the entire duration of a scene and inserted into all video recordings at the appropriate times.

An audio sequence need not be limited to the length of a video recording. For example, a three-second audio sequence may be inserted into a two-second video recording.

Then, at 208, the recording synchronization program 150 combines two or more video recordings based on the anchor points. Combining may include, for example, presenting a synchronized timeline to an editor, stitching two or more recordings together into a combined recording in the same format, or using two or more recordings to create a recording in a new format. Combining may further include removing extraneous audio sequences. Combining may be performed manually, automatically, or by a combination of manual and automatic methods, and may include combining additional recordings not based on anchor points.

In at least one embodiment, combining may include presenting a synchronized timeline to a user or editor in an editing software. Such a timeline may include, for example, a user interface where each row is one device and all of its recordings synchronized by time, with anchor points displayed across each point in time, over the relevant recordings, allowing an editor to, for example, drag and drop video recordings onto a main timeline, cut recordings together, or otherwise combine recordings. Such a user interface may look similar to the diagram of several recording device streams and anchor points 300 at FIG. 3. This user interface may be a part of the recording synchronization program 150, or may be part of an existing software solution configured to synchronize video recordings by matching audio, and audio segments may be encoded in such a manner as to function with existing editing software solutions.

In another embodiment, the recording synchronization program 150 may stitch two or more video recordings together into a combined video recording according to audio anchor points, alternating between scenes, or, alternatively, superimposing scenes on top of one another. As another alternative, the recording synchronization program 150 may use audio anchor points to synchronize recordings in time, and then use a process of artificial intelligence and visual recognition with a trained neural network to combine recordings into a single recording with improved image quality, with improved focus, resolution, or color in key areas. The recording synchronization program 150 may collect feedback from users, including editors or viewers, to train a neural network.

Alternatively, combining may include using two or more video recordings to create a recording in a new format. For example, two or more traditional video recordings may be combined to create a recording in a specialized format of "three-dimensional" video.

Combining may further include removing extraneous audio sequences. For example, the recording synchronization program 150 may note one identical or near-identical wave form across four different video recordings corresponding to anchor point A, and remove all common audio comprising that wave form from each recording at anchor point A. Alternatively, the recording synchronization program 150 may store the audio sequence to assist with removal of that sequence. As another alternative, the recording synchronization program 150 may maintain a master recording without any anchor points or audio sequences to use in a production version of the video.

Combining may include a combination of more than one of the above techniques. For example, combining may include automatically generating one video recording by stitching scenes together, but also present users with a full selection of clips arranged according to anchor points.

The recording synchronization program 150 may combine recordings automatically, or the recordings may be combined manually by a user after being presented with the anchor points in a user interface like the one described above. Combining may further be performed by any combination of manual and automatic methods.

In another embodiment, combining recordings may further include combining additional video recordings not based on anchor points. For example, videos recorded using devices that are connected by a wired network may be synchronized according to a Society of Motion Picture and Television Engineers (SMPTE) standard, and then synchronized with remaining videos by matching audio sequences at audio anchor points.

Combining recordings may further include combining non-audio recordings, such as pure audio recordings, or other types of data recordings such as accelerometer recordings, location data, or weather recordings. For example, editing software may correct colors in one or more video recordings for video that was taken by devices located outside according to weather recordings, and the impact the weather in the weather recordings may have on color and lighting conditions.

Figure 3:
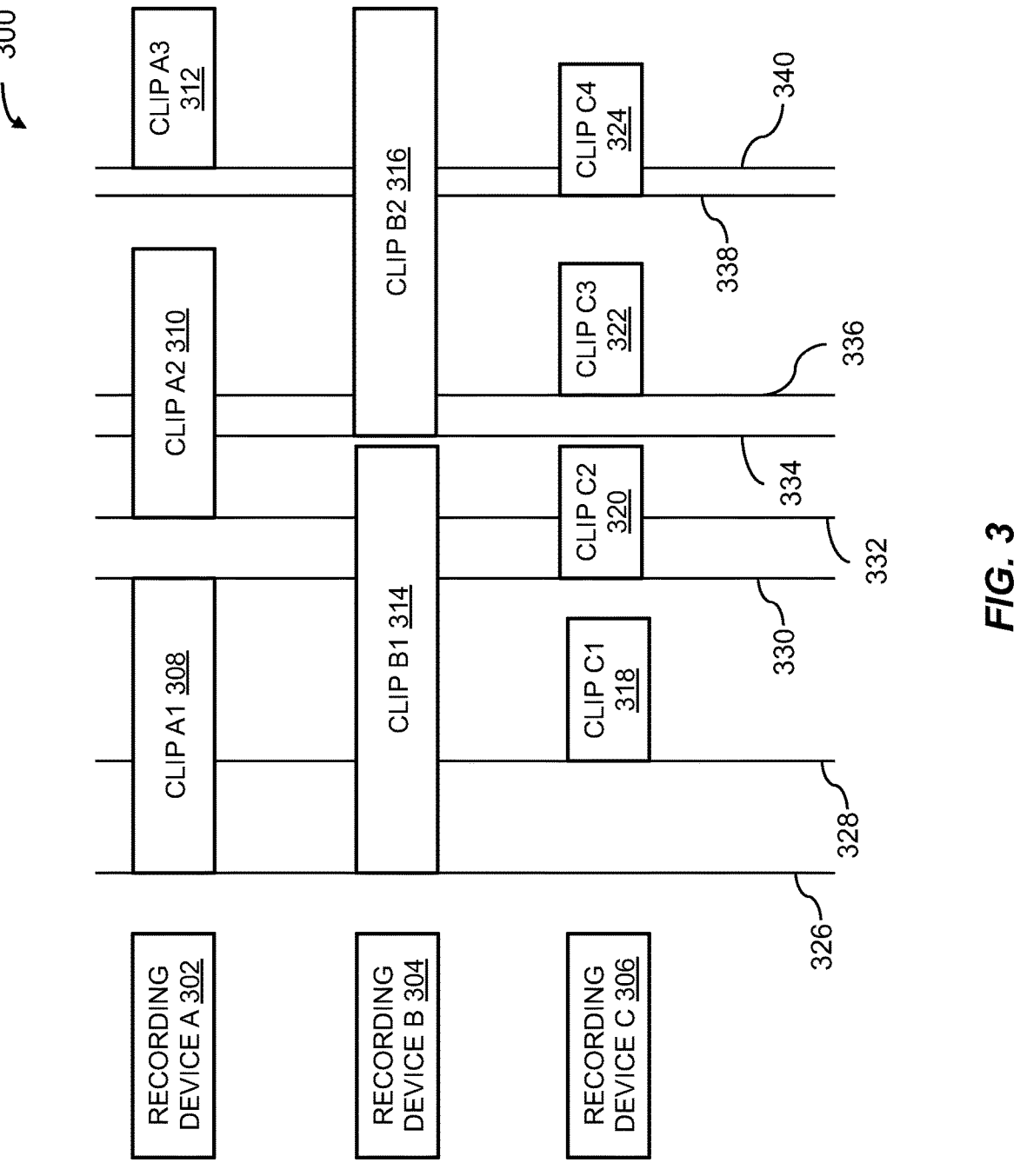
FIG. 3 illustrates a diagram of several recording device streams and anchor points.

Referring now to FIG. 3, a diagram of several recording device streams and anchor points 300 is depicted according to at least one embodiment. This diagram may represent a scene, or reflect a layout that may be used in an editing software user interface as described at 208.

Recording Device A 302, Recording Device B 304, and Recording Device C 306, may each have a corresponding video stream of one or more video recordings or video clips, represented in FIG. 3 as a row colinear with the recording device. For example, the video stream for Recording Device A 302 may include Clip A1 308, Clip A2 310, and Clip A3 312. The video stream for Recording Device B 304 may include Clip B1 314 and Clip B2 316. The video stream for Recording Device C 306 may include Clip C1 318, Clip C2 320, Clip C3 322, and Clip C4 324.

The recording synchronization program 150 may set audio anchor points across all recordings. For example, the recording synchronization program 150 may set an anchor point at the start time of each recording. As portrayed in FIG. 3, anchor points 326; 328; 330; 332; 334; 336; 338; and 340 may correspond, respectively, with the start of Clip A1 308 and Clip B1 314 (which begin simultaneously); Clip C1 318; Clip C2 320; Clip A2 310; Clip B2 316; Clip C3 322; Clip C4 324; and Clip A3 312. The recording synchronization program 150 may insert an audio sequence in each video clip, beginning at the start of each audio anchor point. For example, since anchor point 332 intersects Clip C2 320 and Clip B1 314, and corresponds to the start of Clip A2 310, the recording synchronization program 150 may insert an audio sequence in Clip A2 310, Clip B1 314, and Clip C2 320, all at anchor point 332.

It may be appreciated that FIGS. 2 and 3 each provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

identifying two or more recording devices and a plurality of video recordings, including at least one video recording from each of at least two of the two or more recording devices;

establishing a connection between the two or more recording devices that allows write access to respective video recordings located on the two or more recording devices, the write access allowing one or more anchor points to be set in each respective video recording at a same point in time;

accessing, via the connection between the two or more recording devices, two or more of the plurality of video recordings located on the two or more recording devices;

setting, via the connection between the two or more recording devices, one or more anchor points corresponding to a same point in time into the two or more of the plurality of video recordings located on the two or more recording devices, the one or more anchor points corresponding to an audio sequence in at least one video recording in the plurality of video recordings;

inserting, via the connection between the two or more recording devices, an audio sequence into at least two of the plurality of video recordings at an anchor point in the one or more anchor points to synchronize the at least two of the plurality of video recordings with the audio sequence; and combining the at least two of the plurality of video recordings based on the audio sequence.

2. The processor-implemented method of claim 1, wherein the established connection is a wireless connection.

3. The processor-implemented method of claim 1, wherein the audio sequence is encoded using pulse width modulation.

4. The processor-implemented method of claim 1, wherein the one or more anchor points include at least one anchor point at a starting time of each recording in the plurality of recordings.

5. The processor-implemented method of claim 1, wherein the combining includes displaying a combined timeline user interface to a user.

6. The processor-implemented method of claim 1, wherein at least one of the two or more recording devices is a mobile phone, and another recording device from the two or more recording devices is not a mobile phone.

7. The processor-implemented method of claim 1, further comprising:

removing the audio sequence from one or more of the at least two of the plurality of video recordings.

8. A computer system, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

identifying two or more recording devices and a plurality of video recordings, including at least one video recording from each of at least two of the two or more recording devices;

establishing a connection between the two or more recording devices that allows write access to respective video recordings located on the two or more recording devices, the write access allowing one or more anchor points to be set in each respective video recording at a same point in time;

accessing, via the connection between the two or more recording devices, two or more of the plurality of video recordings located on the two or more recording devices;

setting, via the connection between the two or more recording devices, one or more anchor points corresponding to a same point in time into the two or more of the plurality of video recordings located on the two or more recording devices, the one or more anchor points corresponding to an audio sequence in at least one video recording in the plurality of video recordings;

inserting, via the connection between the two or more recording devices, an audio sequence into at least two of the plurality of video recordings at an anchor point in the one or more anchor points to synchronize the at least two of the plurality of video recordings with the audio sequence; and combining the at least two of the plurality of video recordings based on the audio sequence.

9. The computer system of claim 8, wherein the established connection is a wireless connection.

10. The computer system of claim 8, wherein the audio sequence is encoded using pulse width modulation.

11. The computer system of claim 8, wherein the one or more anchor points include at least one anchor point at a starting time of each recording in the plurality of recordings.

12. The computer system of claim 8, wherein the combining includes displaying a combined timeline user interface to a user.

13. The computer system of claim 8, wherein at least one of the two or more recording devices is a mobile phone, and another recording device from the two or more recording devices is not a mobile phone.

14. A computer program product, the computer program product comprising:

one or more non-statutory computer-readable storage medium and program instructions stored on at least one of the one or more non-statutory computer-readable storage medium, the program instructions executable by a processor capable of performing a method, the method comprising:

identifying two or more recording devices and a plurality of video recordings, including at least one video recording from each of at least two of the two or more recording devices;

establishing a connection between the two or more recording devices that allows write access to respective video recordings located on the two or more recording devices, the write access allowing one or more anchor points to be set in each respective video recording at a same point in time;

accessing, via the connection between the two or more recording devices, two or more of the plurality of video recordings located on the two or more recording devices;

setting, via the connection between the two or more recording devices, one or more anchor points corresponding to a same point in time into the two or more of the plurality of video recordings located on the two or more recording devices, the one or more anchor points corresponding to an audio sequence in at least one video recording in the plurality of video recordings;

inserting, via the connection between the two or more recording devices, an audio sequence into at least two of the plurality of video recordings at an anchor point in the one or more anchor points to synchronize the at least two of the plurality of video recordings with the audio sequence; and combining the at least two of the plurality of video recordings based on the audio sequence.

15. The computer program product of claim 14, wherein the established connection is a wireless connection.

16. The computer program product of claim 14, wherein the audio sequence is encoded using pulse width modulation.

17. The computer program product of claim 14, wherein the one or more anchor points include at least one anchor point at a starting time of each recording in the plurality of recordings.

18. The computer program product of claim 14, wherein the combining includes displaying a combined timeline user interface to a user.

19. The computer program product of claim 14, wherein at least one of the two or more recording devices is a mobile phone, and another recording device from the two or more recording devices is not a mobile phone.

* * * * *